Figure 2:
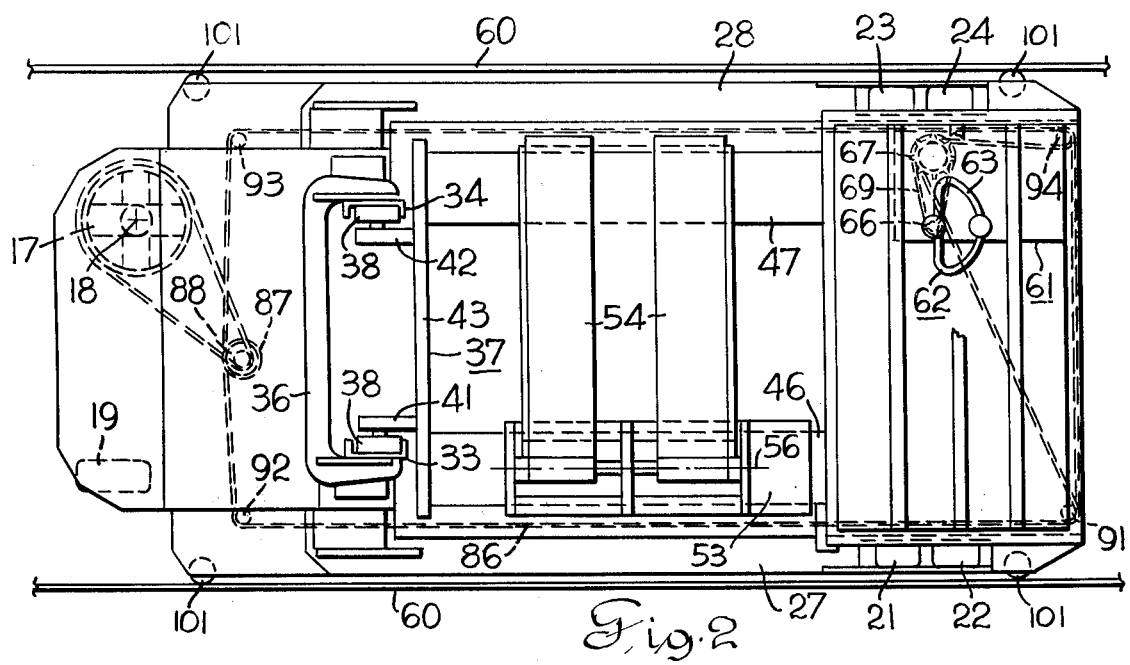
Figure 1:
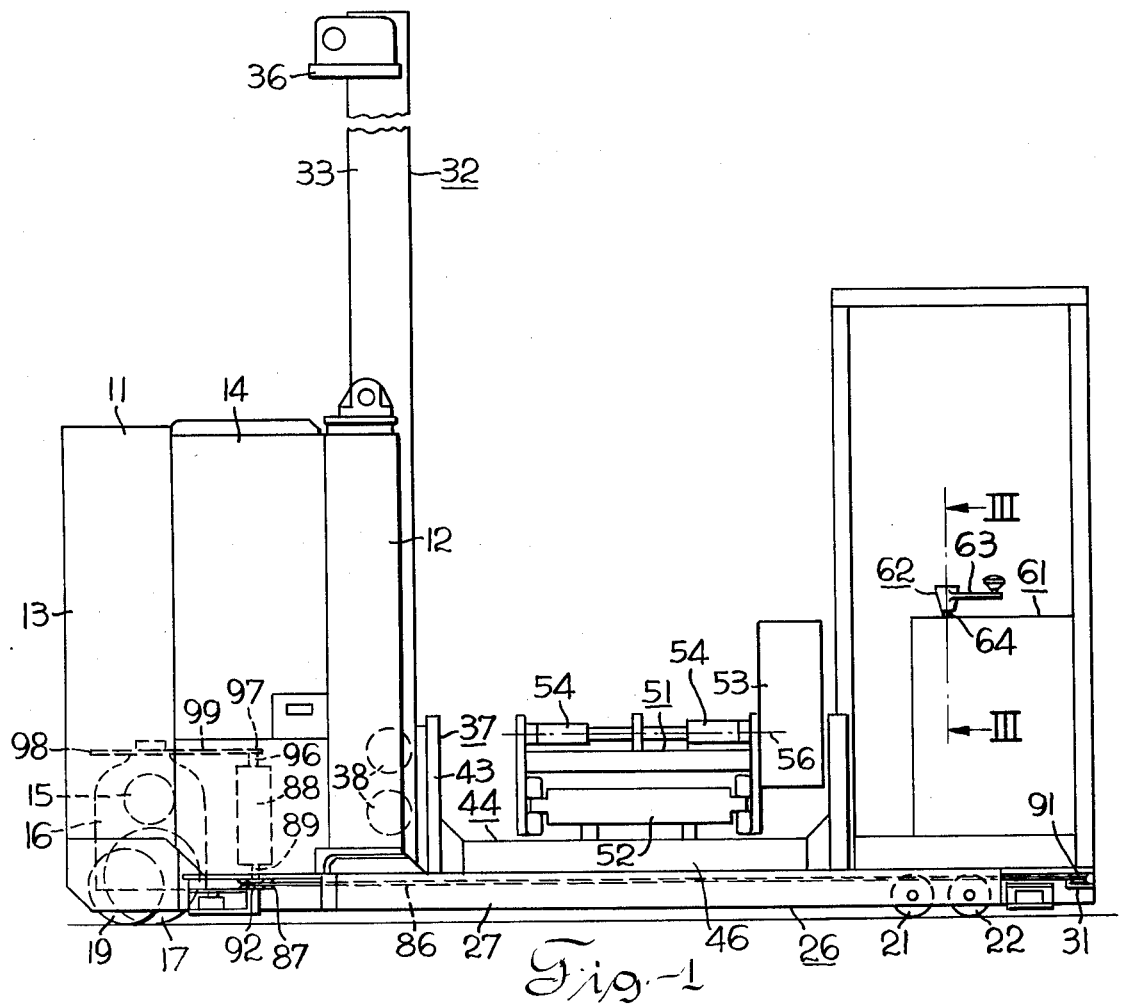

United States Patent [19]
Mecklenburg et al.

[11] 3,910,370
[45] Oct. 7, 1975

[54] DISCONNECTING STEER SYSTEM

[75] Inventors: Clifford G. Mecklenburg, Homewood; George J. Oakley, Glenwood, both of Ill.

[73] Assignee: Allis-Chalmers Corporation, Milwaukee, Wis.

[22] Filed: Oct. 29, 1974

[21] Appl. No.: 518,789

[52] U.S. Cl. ............... 180/77 R; 74/492; 192/67 R; 187/9 R; 182/148; 280/96; 180/79
[51] Int. Cl.² .......................................... E04G 1/18
[58] Field of Search ........ 180/77 R, 77 S, 78, 89 A, 180/89 R, 51, 79; 280/87 R, 87 A, 91, 93, 96; 187/9 R, 9 E; 182/148; 296/28 C

[56] References Cited
UNITED STATES PATENTS

| | | | |
|---|---|---|---|
| 598,453 | 2/1898 | Voelker | 74/492 |
| 3,099,332 | 7/1963 | De Marco et al. | 187/9 R |
| 3,172,500 | 3/1965 | Dolphin et al. | 187/9 R |
| 3,248,123 | 4/1966 | Thomas | 74/496 |
| 3,302,478 | 2/1967 | Pauwels | 280/87 A |
| 3,504,776 | 4/1970 | Misenti | 192/67 R |
| 3,765,500 | 10/1973 | Reeves | 180/77 S |

FOREIGN PATENTS OR APPLICATIONS

| | | | |
|---|---|---|---|
| 2,003,066 | 1/1970 | Germany | 180/77 R |

*Primary Examiner*—Kenneth H. Betts
*Assistant Examiner*—Jack D. Rubenstein
*Attorney, Agent, or Firm*—Charles L. Schwab

[57] ABSTRACT

A lift truck is provided with an operator's station on the carriage whereby the operator is elevated with the carriage and its load handling forks or platform. The operator's station includes a manually operated steering control which is automatically disconnected from the steerable wheel when the carriage is elevated. Steering motion transmitting means between the operator's station and the steerable wheel includes a pair of cooperable torque transmitting members which automatically engage when the carriage is lowered and disengage when the carriage is elevated.

15 Claims, 5 Drawing Figures

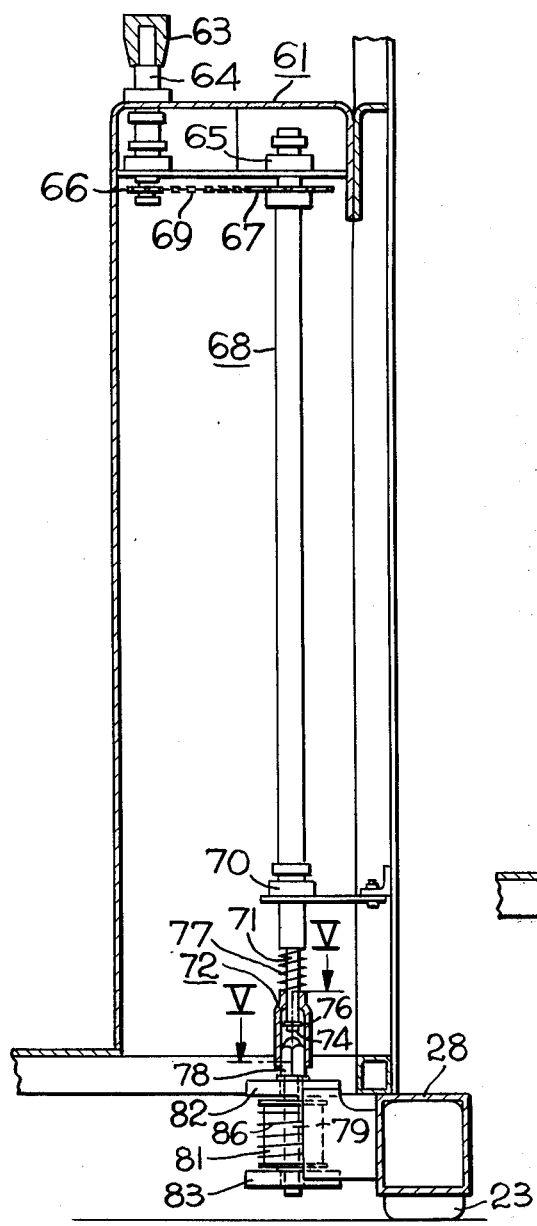
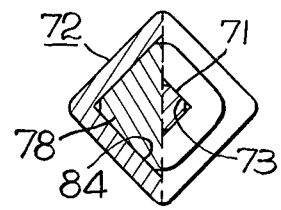
Fig. 5
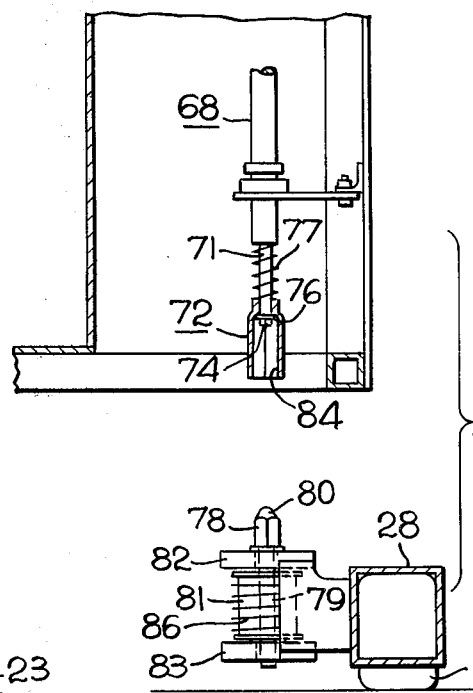
Fig. 4
Fig. 3

AZEOTROPIC SOLVENTS FOR PERMANENT PRESS TREATMENTS OF COTTON AND COTTON BLEND FABRICS

A non-exclusive, irrevocable, royalty-free license in the invention herein described, throughout the world for all purposes of the United States Government, with the power to grant sublicenses for such purposes, is hereby granted to the Government of the United States of America.

This invention relates to the treatment of textiles with methylolated cyclic urea crosslinking agents dissolved in azeotropic solvents with added catalysts to impart permanent press properties to cellulosic materials. This type of system should find use in decreasing water pollution since the azeotrope may be reclaimed at relatively low expenditure of power due to the decreased boiling points of these mixed solvents. From the standpoint of economics, cyclic processes involving reclamation of solvent would circumvent the need for discharge of waste water into streams resulting in a cheaper process.

DEFINITION

For the purpose of this patent, an azeotropic mixture is defined as a solution of two or more liquids, the composition of which does not change upon distillation. Further, such a solution distills without a change in temperature or composition. Azeotropes of water and one or more other solvents are well known and have been used in prior art processes throughout various chemical processes in which solvent recycling is desirable.

The main object of the instant invention is to provide a process wherein enhanced dry and wet wrinkle recoveries may be imparted to cellulosic textiles via low boiling azeotropic solvents using a number of N-methylol cyclic ureas in the presence of external catalysis.

A second object of the instant invention is to apply the process to cellulosic textiles from predominantly nonaqueous solvents without drying the fabric before curing.

A further object of the present invention is the contribution of a solution to ecological problems of the textile industry. Bearing in mind that the azeotropes of this invention boil at temperatures lower than the boiling point of water alone, recycling of the azeotropic mixtures can be accomplished at lower expenditures of time and energy with the supplemental incentive and improvement in ecological service since disposal of waste water would be minimized or eliminated.

THE PRIOR ART

To those skilled in the art it is well known that aqueous solutions of N-methylolated cyclic ureas such as dimethylolethylene urea (DMEU) or dimethyloldihydroxyethylene urea (DMDHEU) can be reacted with cellulosic textiles in the presence of added Lewis acid type catalysts, such as mineral acids or acid salts, to impart desirable permanent press properties to the finished fabric or garment. Ziifle et al. (Textile Res. J. 31, No. 4, pp. 349–365, 1964) have applied DMEU to cotton cellulose in the presence of several metal salt catalysts to obtain enhanced dry and wet wrinkle recovery. Further, Gonzales et al. (U.S. Pat. No. 3,645,667) have shown the utility of certain mixed solvents to dissolve DMEU to impart these same desirable permanent press properties.

In accordance with the main object of the instant invention, it is required that specific azeotropic solvents be used which both solubilize a number of resins with added catalysts and allow the reaction to proceed at relatively low cure temperatures with reclamation of solvent feasible at much lower temperatures because of the azeotropic nature of the solvents employed. Prior art processes required a drying step to produce desirable properties. Ziifle et al. employed a 60°C drying period of 7 min. prior to curing at an elevated temperature in order to achieve the desirable permanent press properties In accordance with the second object of the instant invention described above, we do not require a drying step; in fact, the treatments are superior without a drying step previous to the curing step because of the high volatility of the azeotropic mixtures.

The impregnation of a cellulosic textile is generally carried out in this manner. The material is immersed in an azeotropic solvent such as isopropanol-water (87% to 12.3% by weight), tertiary butyl alcohol-water (88.3 to 11.7%), n-propanal alcohol-water (71.7 to 28.3%), dioxane-water (81.6 to 18.4%), or methyl ethyl ketone-water (89% to 11%). The treating bath is also about 0.55 molar concentration in DMDHEU or DMEU with added 0.03 M $Zn(NO_3)_2$ as catalyst. Any of a number of N-methylolated compounds may be used in the process and they include urea formaldehyde, dimethylol urea, dihydroxyethylene urea, propylene urea, trimethylolmelamine and the like. Concentration of the N-methylol compounds can range from 2% on up to 50% limited only by their solubility in the azeotropes aforementioned. Catalysts that can be used are any of a number of Lewis acids and include $ZnCl_2, Zn(NO_3)_2$, $MgCl_2$, $MG(NO_3)_2$, citric acid, hydrochloric acid, $Zn(BF_4)_2$, acetic acid, acetic acid-citric acid mixtures and the like, amine hydrochlorides, and aluminum chlorohydroxide. Concentration of the catalyst can range from 0.01 molar up to 0.5 molar. Once the textile has been impregnated from the treating bath to a wet pickup of about 80 to 100%, it is then submitted to a cure of from about 100° to 160°C for from 0.5 to 3 minutes. For the process of this invention, it is desirable to add a catalyst for the purpose of obtaining improved wrinkle recovery properties of a fabric.

The cellulosic textiles to which our invention can be applied include cotton, cotton-polyester blends, rayon, ramie, jute, flax, and the like and in the case of cotton we have specifically applied our invention to the textile in the form of woven fabrics with satisfactory results. Those skilled in the art can readily visualize the extention of this application to other forms of textiles in the realm of cellulosic materials.

The treated cotton fabrics were submitted to selected standard tests as well as the other tests indicated here. Breaking strength determinations were done by the ASTM Method D39–49; dry wrinkle recovery determinations were done by the ASTM Method D1295–60T; flex abrasion (bar 575) values were obtained by the ASTM Method D1175–64T; and wet wrinkle recovery determinations were done by the Lawrence and Phillips method described in American Dyestuff Reporter, vol. 45, P. 548–550, 5 6 1 (1956). Nitrogen values were obtained by the Kjeldahl Method and formaldehyde values were obtained by the chromotropic acid method.

The following examples are presented to illustrate the invention, and since procedure and conditions can be varied by those skilled in the art, the examples are not set forth to establish any particular limits.

EXAMPLE 1

Desized, scoured and bleached (80×80) cotton printcloth was twice padded with a 0.55 M solution of dimethyloldihydroxyethyleneurea (DMDHEU) in 87.7% isopropanol - 12.3% $H_2O$ azeotrope with 0.03M $Zn(NO_3)_2$ added to about 90% wet pickup and cured for 3 minutes at 160°C. The fabric was then rinsed free of excess reagents in hot tap (pH 10) water for 15 minutes, rinsed in distilled water, ironed dry and allowed to air equilibrate before testing. The fabric had a 7.0% weight add-on, a 1.61% nitrogen and a 3.38% formaldehyde content with dry and wet wrinkle recovery of 293 and 278 (W+F)°. The breaking strength was 30.4 lbs and the elongation at break was 4.4%. The abrasion resistance was 52 cycles. Control fabric properties were 200° and 156° (W+F) for the dry and wet wrinkle recovery, 55 lbs breaking strength and 7.1% elongation at break with 764 cycles for flex abrasion.

EXAMPLE 2

The following examples are provided to show that the cure temperature may be lowered to give excellent wrinkle recovery properties where fabrics are treated as in Example 1 with the resultant fabric properties listed in the following table.

| Cure Temp. (°C) (3 min. cure) | Add-on % | Nitrogen % | Formaldehyde % | Wrinkle Recovery (W+F)° | |
|---|---|---|---|---|---|
| | | | | Dry | Wet |
| 80 | 0.9 | 0.3 | 0.4 | 185 | 179 |
| 100 | 5.4 | 1.2 | 1.9 | 257 | 230 |
| 120 | 7.2 | 1.6 | 3.1 | 289 | 270 |
| 140 | 6.6 | 1.5 | 3.3 | 296 | 282 |

EXAMPLE 3

The following examples are illustrated to show that other azeotropes can be substituted for that in Example 1 with the following conditions as listed in the table.

| Azeotrope Used | | Cure Temp. (°C) (3 min. cure) | Add-on % | Wrinkle Recovery (W+F)° | |
|---|---|---|---|---|---|
| % Organic Solvent | % Water | | | Dry | Wet |
| 89.0 Methyl ethyl ketone | 11.0 | 100 | 14.0 | 249 | 233 |
| | | 140 | 12.8 | 302 | 258 |
| | | 160 | 8.6 | 225 | 219 |
| 81.6 Dioxane | 18.4 | 100 | 4.9 | 265 | 243 |
| | | 140 | 7.2 | 288 | 284 |
| | | 160 | 7.3 | 291 | 287 |
| 71.7 n-propanol | 28.3 | 120 | 8.5 | 286 | 267 |
| | | 140 | 7.7 | 299 | 275 |
| | | 160 | 7.4 | 291 | 284 |
| 88.3 T-butanol | 11.7 | 120 | 8.1 | 275 | 281 |
| | | 140 | 8.8 | 245 | 295 |
| | | 160 | 9.1 | 273 | 295 |

EXAMPLE 4

The following examples are illustrated to show that 0.55 M dimethylolethyleneurea (DMEU) can be used instead of DMDHEU with $Zn(NO_3)_2$ catalyst as shown in the following table.

| Azeotrope | Cure Temp (°C) (3 min. cure) | Nitrogen % | Formaldehyde % | Add-on % | Wrinkle Recovery (W+F)° | |
|---|---|---|---|---|---|---|
| | | | | | Dry | Wet |
| 1[a] | 120 | 1.71 | 3.67 | 7.4 | 275 | 233 |
| | 140 | 1.90 | 4.11 | 8.5 | 280 | 252 |
| 2 | 120 | 2.23 | 2.44 | 7.8 | 235 | 224 |
| | 140 | 2.15 | 3.94 | 7.9 | 283 | 249 |
| 3 | 120 | 1.61 | 3.59 | 6.8 | 288 | 264 |
| | 140 | 1.74 | 3.54 | 7.4 | 291 | 275 |
| 4 | 120 | 1.86 | 3.74 | 8.5 | 282 | 254 |
| | 140 | 2.11 | 4.06 | 9.7 | 289 | 256 |

[a]1 is 88.3% t-butanol — 11.7% $H_2O$
2 is 89% methylethylketone — 11% $H_2O$
3 is 71.7% n-propylalcohol — 28.3% $H_2O$
4 is 81.6% dioxane — 18.4% $H_2O$

We claim:

1. A process for improving the treatment of cellulosic textiles with N-methylolated ureas in the presence of Lewis acid catalyst wherein the improvement consists of dissolving said methylolated ureas in azeotropes of water and a member of the group consisting of isopropyl alcohol, methylethyl ketone, t-butyl alcohol, n-propyl alcohol, and dioxane, to produce nitrogen-containing chemically modified cellulosic textiles and a recyclable reagent bath.

2. An improved method of producing nitrogen-containing chemically modified cellulosic textiles in the reaction of the cellulosic textile with an N-methylolated compound, the improvement consisting of the employment of azeotropic recyclable mixtures, the method comprising:

a. impregnating a cellulosic textiel to a wet-pickup of about from 80 to 100% with a solution containing about from 2 to 50% of an N-methylolated compound selected from the group consisting of dimethylolethyleneurea, dimethyloldihydroxyethyleneurea, urea formaldehyde, dimethylol urea, dihydroxyethylene urea, propylene urea, and trimethylolmelamine, and about from 0.01 to 0.5 mole of a Lewis acid catalyst selected from the group consisting of zinc nitrate, zinc chloride, magnesium chloride, magnesium nitrate, citric acid, hydrochloric acid, zinc flouroborate, acetic acid, acetic acid/citric acid misture, and aluminum chlorhydroxide dissolved in an aqueous azeotropic mixture consisting of:
  87.7 – 12.3% isopropanol-water,
  88.3 – 11.7% tertiary butyl alcohol-water,
  71.7 – 28.3% n-propyl alcohol-water,
  81.6 – 18.4% dioxane-water, and
  89 – 11% methylethyl ketone-water;

b. curing rhe wet impregnated cellulosic textile for about from 0.5 to 3 minutes at about from 100° to 160°C, and c. washing and drying the cured textile.

3. The method of claim 2 wherein the N-methylolated compound is dimethylol ethyleneurea.

4. The method of claim 2 wherein the N-methylolated compound is dimethyloldihydroxyethyleneurea.

5. The method of claim 2 wherein the N-methylolated compound is urea formaldehyde.

6. The method of claim 2 wherein the N-methylolated compound is dimethylol urea.

7. The method of claim 2 wherein the N-methylolated compound is dihydroxyethylene urea.

side loading means mounted on said support for moving loads laterally to and from said carriage, an operator's station mounted on said support forwardly of said side loading means, including a manually operable steering control member, a first rotatable torque transmitting member mounted on said station, first motion transmitting means operatively interconnecting said first torque transmitting member with said steering control, a second rotatable torque transmitting member mounted on said support adapted for cooperable torque transmitting engagement with said first torque transmitting member when said carriage is in its lowered position, said torque transmitting members being disengaged when said carriage is elevated a predetermined distance from said lowered position, and second motion transmitting means operatively interconnecting said drive wheel and said second torque transmitting member.

14. The structure of claim 13 wherein said first motion transmitting means includes a vertically disposed shaft and wherein said first member has a vertical slidable torque transmitting connection with said shaft.

15. The structure of claim 14 and further comprising resilient biasing means operatively interposed between said shaft and first member urging the latter toward said second member.

* * * * *